US008132540B1

(12) United States Patent
Strebeigh

(10) Patent No.: US 8,132,540 B1
(45) Date of Patent: Mar. 13, 2012

(54) TRIMMER

(76) Inventor: Timothy Lee Strebeigh, Colorado Springs, CO (US)

( * ) Notice: Subject to any disclaimer, the term of this patent is extended or adjusted under 35 U.S.C. 154(b) by 149 days.

(21) Appl. No.: 12/546,460

(22) Filed: Aug. 24, 2009

Related U.S. Application Data

(60) Provisional application No. 61/156,021, filed on Feb. 27, 2009.

(51) Int. Cl.
*A01K 13/00* (2006.01)
*B26B 19/02* (2006.01)

(52) U.S. Cl. ........... 119/610; 119/601; 119/609; 30/216

(58) Field of Classification Search .................. 119/600, 119/601, 607–619, 625, 633; 30/200, 210, 30/216; 15/143.1, 236.01, 236.02; 81/177.1, 81/489, 177.3; D30/158, 159; 16/430
See application file for complete search history.

(56) References Cited

U.S. PATENT DOCUMENTS

| | | | | | |
|---|---|---|---|---|---|
| 155,855 | A * | 10/1874 | Burgess | 30/210 |
| 1,871,700 | A * | 8/1932 | Jeppsson et al. | 30/216 |
| 1,956,042 | A | 4/1934 | Oster | |
| 2,178,019 | A * | 10/1939 | Knuteson | 30/169 |
| 2,827,695 | A * | 3/1958 | Vitale | 30/210 |
| 3,093,901 | A | 6/1963 | Wahl | |
| 3,209,455 | A * | 10/1965 | Gnage | 30/200 |
| 3,430,342 | A | 3/1969 | Wahl | |
| 3,581,396 | A * | 6/1971 | Broussard | 30/201 |
| 3,947,960 | A | 4/1976 | Urbaniak | |
| 3,988,828 | A * | 11/1976 | Geary | 30/210 |
| 3,999,295 | A | 12/1976 | Du Bois | |
| 4,020,549 | A | 5/1977 | Edwards | |
| 4,106,190 | A | 8/1978 | Buras, Jr. et al. | |
| 4,221,050 | A * | 9/1980 | Walter et al. | 30/216 |
| 4,326,138 | A | 4/1982 | Shtrikman | |
| 4,498,237 | A | 2/1985 | Mack et al. | |
| 4,573,267 | A * | 3/1986 | Grohoski et al. | 30/133 |
| 4,868,988 | A | 9/1989 | Han | |
| 4,979,303 | A * | 12/1990 | Han | 30/210 |
| 5,060,380 | A | 10/1991 | Fujikawa | |
| 5,068,966 | A | 12/1991 | Wahl et al. | |
| 5,237,750 | A | 8/1993 | Nakano et al. | |
| 5,404,644 | A * | 4/1995 | Needham et al. | 30/123 |
| 5,417,197 | A * | 5/1995 | Bankstahl | 124/35.2 |
| 5,503,109 | A * | 4/1996 | Sporn | 119/633 |
| 5,519,939 | A | 5/1996 | Smith | |
| 5,865,192 | A | 2/1999 | Sealy | |
| 6,421,922 | B2 | 7/2002 | Beutel et al. | |
| 6,516,521 | B1 | 2/2003 | Rush et al. | |
| 6,986,206 | B2 | 1/2006 | McCambridge et al. | |
| 7,281,461 | B2 | 10/2007 | McCambridge et al. | |
| D558,924 | S | 1/2008 | Cafaro et al. | |
| 7,346,990 | B2 | 3/2008 | Dirks et al. | |

(Continued)

OTHER PUBLICATIONS

Spectrum Brands, Inc., Madison, WI; Remington Shortcut Clipper Use and Care Guide for models SCC-100R and SCC-100RC; 19 pages, dated Jan. 15, 2008.

(Continued)

*Primary Examiner* — Kimberly Smith
*Assistant Examiner* — Joshua Huson
(74) *Attorney, Agent, or Firm* — A Law Firm, PC; Aileen Law

(57) ABSTRACT

Disclosed is a palm-held device having a cutting assembly which exposes blades on two edges simultaneously to enable a user to cut a target's hair or fur with either edge by moving the device in the desired direction.

11 Claims, 7 Drawing Sheets

U.S. PATENT DOCUMENTS

| | | | | |
|---|---|---|---|---|
| 7,717,067 | B2 * | 5/2010 | Porter et al. | 119/601 |
| 2002/0104182 | A1 * | 8/2002 | Panfili et al. | 15/236.01 |
| 2006/0027554 | A1 * | 2/2006 | Hashimoto | 219/225 |
| 2008/0072430 | A1 * | 3/2008 | Cafaro et al. | 30/45 |
| 2008/0155834 | A1 * | 7/2008 | Li et al. | 30/210 |
| 2009/0183376 | A1 * | 7/2009 | Wang | 30/233.5 |

OTHER PUBLICATIONS

Philips Electronics Ltd., Markham, Ontario, CA; Product Leaflet for Philips Hair Clipper Model No. QC5170; 2 pages; dated Jul. 17, 2009.

Wahl Clipper Corporation, Sterling, IL, Wahl Pocket Pro(R) Compact Trimmer Model No. 9861-700; http://www.wahlanimal.com/ax_commerce/shp_detail.cfm?category=BFCC3BF6-01E5-4821-C1796113BB19D9D1&productID=2D247D7O-CB3B-B585-6A4909EEB872DFB9; 1 page, printed Dec. 22, 2009 (original publication date unknown).

Kim Laube & Co., Inc., Oxnard, CA; Laube Trimmer Kits; www.kimlaubecoshop.com/trimmerkits.aspx, three pages, printed Dec. 22, 2009 (original publication date unknown).

* cited by examiner

TRIMMER

CROSS REFERENCE APPLICATIONS

This application is a non-provisional application claiming the benefits of provisional application No. 61/156,021 filed Feb. 27, 2009.

FIELD OF ART

The disclosed device and method relate generally to a powered hand-held clipping device, and more specifically to a grooming instrument for pets and other mammals.

BACKGROUND

It is well-known that there are many electric hair clippers in differing grades from bargain consumer units to high-end professional units available to consumers, barbers, beauty shops, small animal groomers, large animal groomers and shearers. Most consumer grade clippers are intended for personal use by individual consumers and can be sold in kits that include accessories such as clipper guides useful for adjusting the length of a cut. Professional clipper units are intended for hair care and grooming professionals with the accessories often being sold separately. However, the quality difference between the consumer grade and professional grade electric clippers has narrowed significantly over the years. Today the primary difference between the two grades is usually added or enhanced insulating for internal electrical components to prevent units from heating up during periods of prolonged usage.

Animal grooming is the practice of caring for the appearance of an animal for personal or showing purposes. Grooming rituals for dogs, for example, can include washing, hair clipping and cutting, nail clipping, powdering, hair styling, and teeth cleaning. Various breeds and species may require a groomer to pay particular attention to variations in styling patterns as well as the clipping of body parts safely without fear of injury to the animal and/or the operator.

Groomers are often skilled in knowing how to simultaneously hold an animal and the necessary tools effectively. In many cases, the process of hair clipping and cutting can involve the tethering or restraining of the animal. Some animals, such as cats, may require more than one technician to hold or restrain the animal. Animals can often become uncomfortable or nervous in such positions. Thus, there is a need for a device that provides for the quick and easy removal of hair or fur and that is not only robust and durable, but is also safe, comforting, and easy-to-use.

There are a number of trimmers that are commercially available which require an operator to hold the device at a specific angle so that the narrow cutter (blade portion) of the device can be carefully guided over the animal's body. These prior art devices are often awkward for the operator to use and can be uncomfortable. For example, the operator's hands and/or arms may have to be placed in difficult positions and at awkward angles. To maintain a good visual perspective, the operator's head may need to be placed in an uncomfortable position. The disclosed device, on the other hand, enables an operator to hold the apparatus with a comfortable, ergonomic grip that is natural to the user. In addition, the disclosed device enables the operator to use a petting action or natural stroke or motion to guide the apparatus over the animal's body. In the case of personal grooming, the disclosed device enables the operator to use a normal head stroking action to guide the apparatus over his or her hair.

There are a number of grooming gloves and rubberized devices that allow for an operator to simulate a natural petting action. However, these devices are simply washing or bathing devices that may or may not remove hair or fur. In addition, the Applicant is aware of a hand-held clipper manufactured by Remington Products Company, LLC (Madison, Wis.) that resembles a brush that can cut to the shape or a person's scalp (see www.remingtonshortcut.com. It appears that the cutting assembly of the Remington device consists of longitudinally aligned blades that are set in a substantially arcuate path similar to those disclosed in Mack et al. (U.S. Pat. No. 4,498, 237) or Smith (U.S. Pat. No. 5,519,939). Also known is a hand-held clipper having a pivoting cutting assembly that is manufactured by Koninklijke Philips Electronics N.V. (see www.philips.com). The cutting assembly of the Philips QC5170 device resembles a conventional blade assembly wherein the blades extend toward the front of the device but which can pivot from side-to-side 180° to extend from the side of the device. It is believed however that none of the prior art systems referred to above comprise, among other things, a palm-held device having blades on two edges simultaneously to enable a user to cut a target's hair or fur with either edge by moving the device in the desired direction.

SUMMARY OF THE DISCLOSURE

The disclosed device provides a palm-held device having blades on two edges simultaneously to enable a user to cut a target's hair or fur with either edge by moving the device in the desired direction. The disclosed device provides an ergonomic hand-held grooming tool that quickly and easily removes hair or fur. In addition, the disclosed device enables the operator to use a petting action or natural stroke to guide the tool over the animal's body. In the case of personal grooming, the disclosed device enables the operator to use a normal head stroking action to guide the tool over his or her hair.

An object of the disclosed device is to provide a blade assembly having blades on two opposing edges to enable a user to cut a target's hair multidirectionally.

An object of the disclosed device is to reduce the stress level of the target being groomed by allowing an operator to use a petting action or natural stroke to guide the tool over the target cutting surface.

Another object of the disclosed device is to provide a unit that allows a user to comfortably and ergonomically grasp its housing.

Another object of the disclosed device is to provide an adequate blade camber to follow a target's contours.

Another object of the disclosed device is to provide a device that can be transitioned between right-handed use and left-handed use.

An object of the disclosed device provides a blade length that results in fewer strokes to adequately trim a target's hair or fur.

Another object of the disclosed device is to provide a tool with an ergonomic design to help to reduce arm, wrist, and neck discomfort in and/or injury to the user.

These and other advantages of the disclosed device will appear from the following description and/or appended claims, reference being made to the accompanying drawings that form a part of this specification wherein like reference characters designate corresponding parts in the several views.

Before explaining the disclosed embodiments of the disclosed device in detail, it is to be understood that the device is not limited in its application to the details of the particular arrangements shown, since the device is capable of other embodiments. Also, the terminology used herein is for the purpose of description and not of limitation.

DESCRIPTION OF THE DISCLOSED EMBODIMENT

The following description is provided to enable any person skilled in the art to make and use the disclosed apparatus. Various modifications, however, will remain readily apparent to those skilled in the art, since the generic principles of the present apparatus have been defined herein to provide for a hand-held grooming tool that allows for an operator to trim hair or fur by utilizing a natural stroke in guiding the device.

Figure 1:
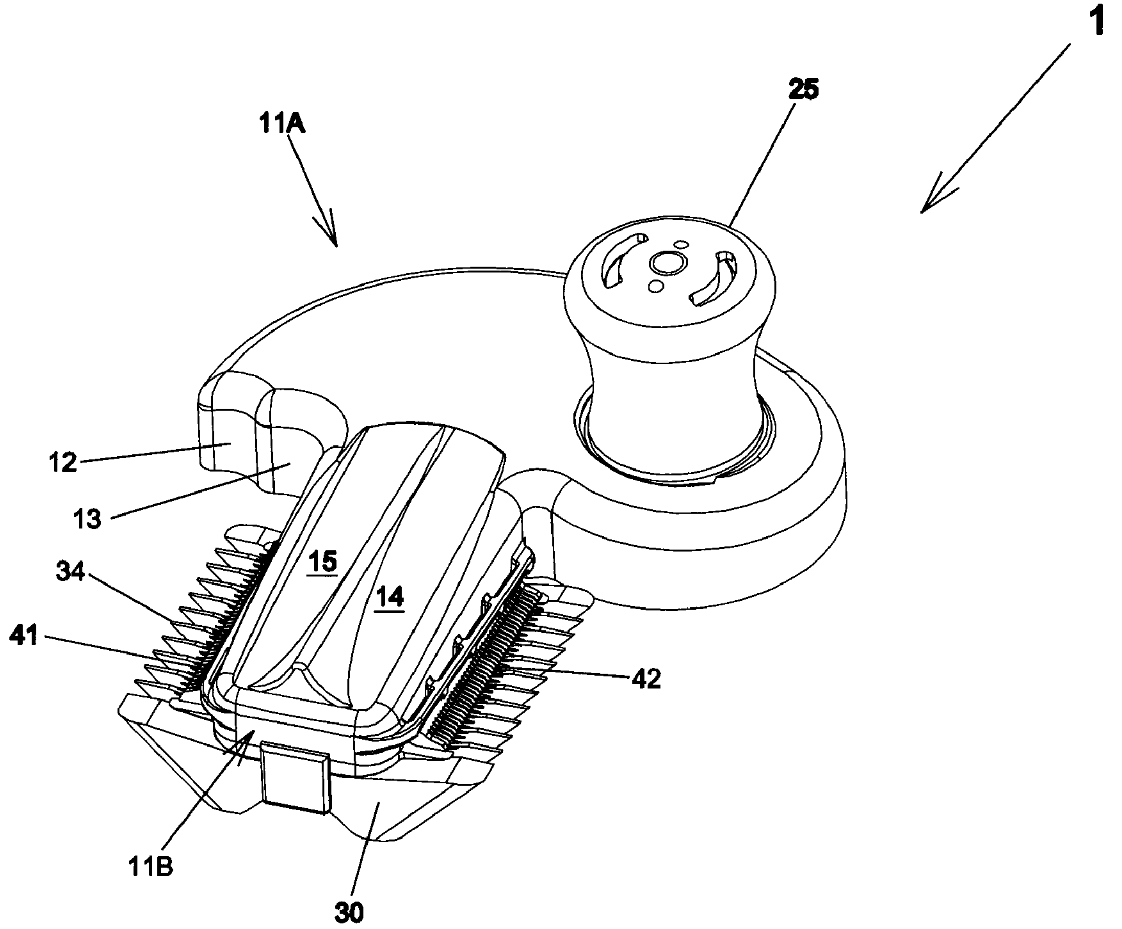
FIG. 1 is an isometric view of one embodiment of the disclosed device.
Figure 2:
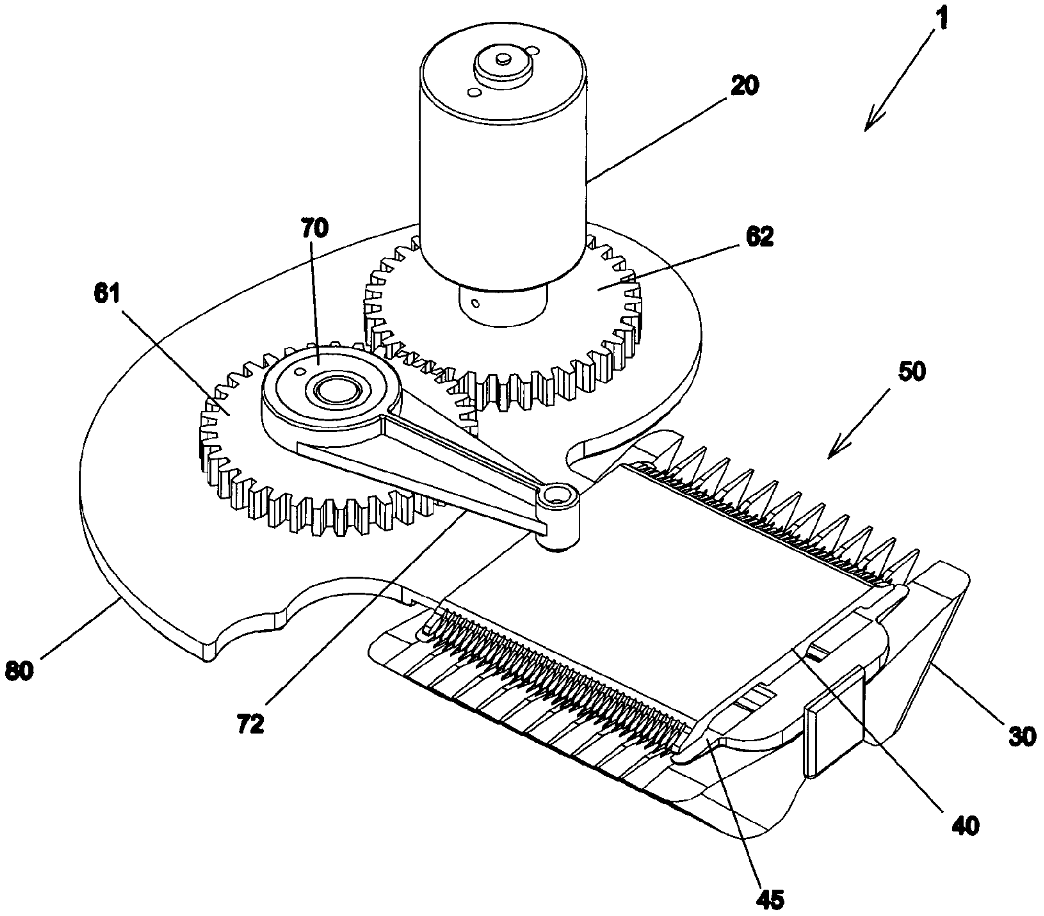
FIG. 2 depicts a cutaway view of the device shown in FIG. 1.
Figure 3:
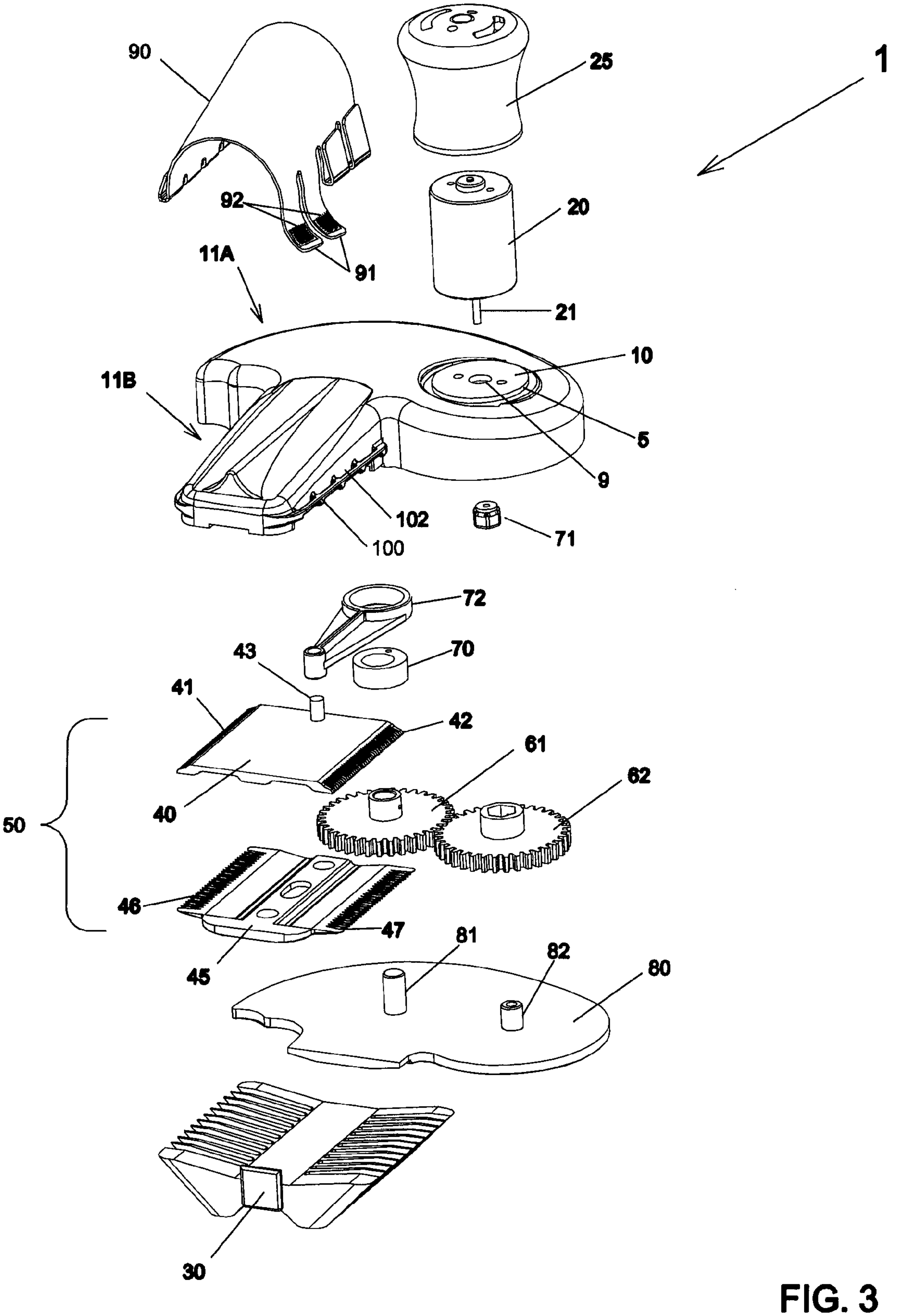
FIG. 3 depicts an exploded view of one embodiment of the device.

FIGS. 1-3 depict a right-handed embodiment of tool 1. In operation, a user can grasp tool 1 by positioning his/her thumb around motor housing 25 and placing his/her little and ring fingers in grooves 12, 13 positioned at an end of an upper portion 11A. The user may also rest his/her index and middle fingers in grooves 14, 15 positioned atop a lower portion 11B. Thus, tool 1 can be cradled in a user's palm. A user can then place edges 34, 35 of comb 30 on the surface of a target, press gently thereon, and stroke along the grain of the hair or fur of the target. Blades 41, 42 and blades 46, 47 are designed to cut the target's hair or fur during the act of stroking or petting of the target.

Assume, for example, the head of an animal is positioned to the left of the user. From the perspective of a user looking at the left flank of the animal, tool 1 can be stroked along the grain of the hair or fur from left to right. If the head of an animal is positioned to the right of the user, tool 1 can be stroked along the grain of the hair or fur from right to left. To trim the underbelly of an animal, tool 1 can be stroked along the grain of the hair or fur from front to back or front to back depending on the positioning of the animal. Cutting against the grain of the hair or fur should be performed carefully. In any case, difficult cutting positions and angles can easily be accommodated with the disclosed device. The blade assembly of the device comprises blades on two opposing edges to enable a user to cut a target's hair or fur with either edge by moving the device in the desired direction. Under most circumstances, the animal is less impacted by the motion of the operator's hands, arms, etc.

FIG. 2 depicts a cutaway view of the device shown in FIG. 1. Blade plate 40 is mounted on anvil 45 to form a blade assembly 50 (see also FIG. 3). Blade plate 40 comprises blades 41, 42. Anvil 45 comprises blades 46, 47. Blade assembly 50 is attached to motor 20 by means of gears 61, 62, cam 70 and linkage 72. When the motor is activated via battery power or electrical power, the blades will vigorously vibrate horizontally. This action produces enough movement to effectively cut hairs without yanking them from their roots. A motor such as the Mabuchi #RC-280 RA-2485 can be suitable with this embodiment. In addition, it is contemplated that spur gears having a gear ratio of 1:1 can be utilized. Other ratios could be used to accommodate variations in speed. In one embodiment, a 24DP spur gear, model 24DP-36T-1.50PD was selected for use.

Other configurations of the components of the disclosed device could be employed if suitable. Further, one having skill in the art would recognize that the disclosed device could be activated by known means such as a switch or button, the location of which would be suitably located for ease and for safety. In addition, the device contemplates the accommodation of variable speeds for user convenience.

Figure 6:
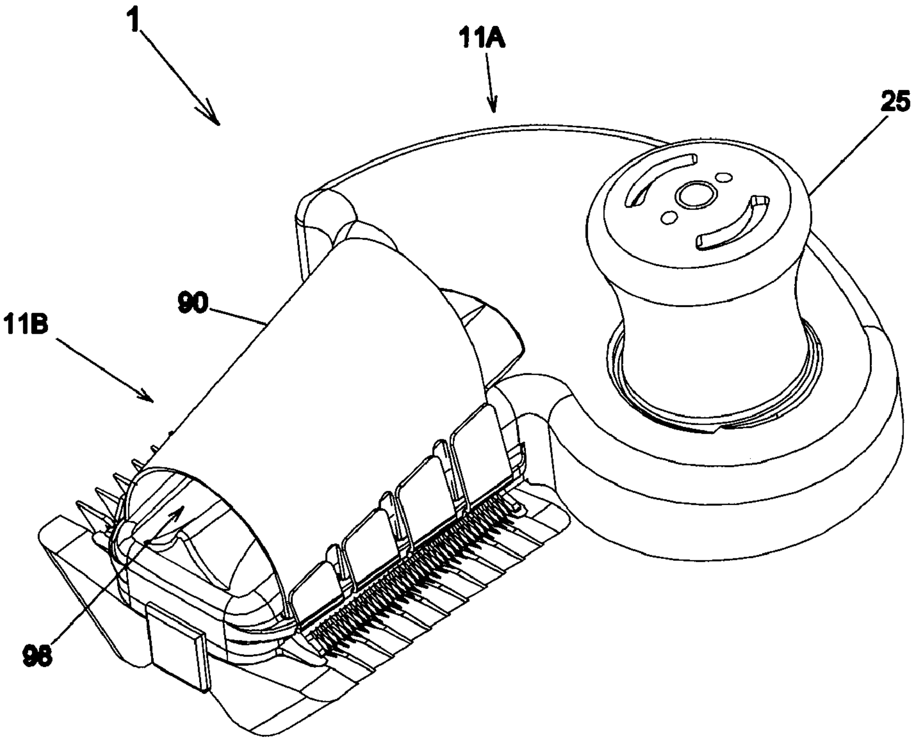
FIG. 6 is an isometric view of an embodiment of the disclosed device having a finger sleeve.

FIG. 3 depicts an exploded view of the device shown in FIGS. 1, 6. Upper portion 11A takes the form of a shell to accommodate the internal components of the disclosed device. Thus, an undersection of portion 11A can be hollow. In a solid construction, portion 11A could comprise depressions to seat the various components. Cover plate 80 serves to enclose the internal components of the disclosed device and can be fastened in place by known means. Gears 61, 62 can be mounted on pins 81, 82, respectively.

In this embodiment, motor 20 and motor housing 25 are mounted on portion 11A so as to provide a right-handed embodiment. Base 10 comprises receiver hole 9 to receive shaft 21 of motor 20 therethrough. An end of shaft 21 engages drive nut 71 mountable to cam 70. Pin 43 engages a receiver end of linkage 72. Motor housing 25 is seated in depression or groove 5 where it can be fastened by known means. For example, an adhesive material may be used to fasten the motor housing. In other embodiments, it is contemplated that a twist-to-lock mechanism could be more suitable.

Figure 4A:
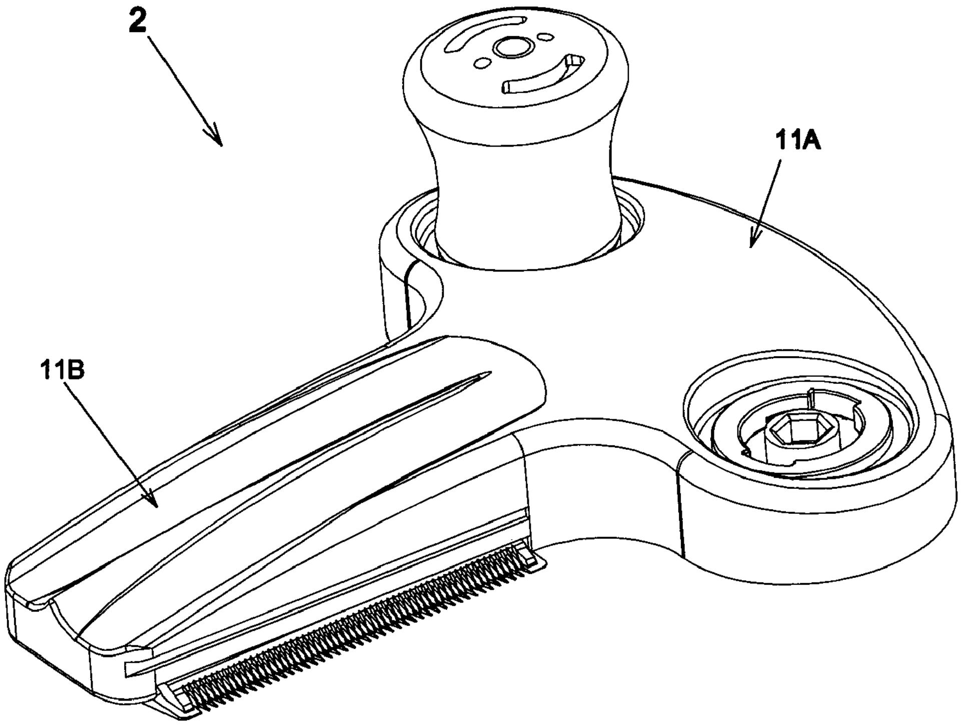
FIGS. 4A, 4B depict an embodiment of the disclosed device that allows for interchangeability between right-handed use and left-handed use.
Figure 4B:
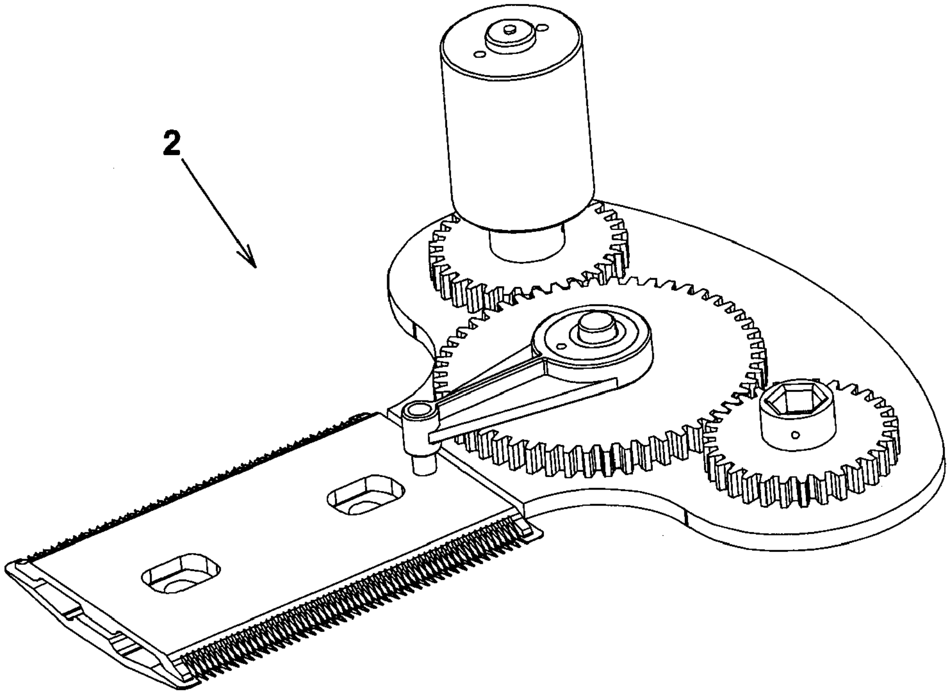

One having skill in the art would recognize that it may be desirable to reverse the mount of motor 20 and motor housing 25 on portion 11A so as to provide a left-handed embodiment. Such a modification and variation can be made and still the result will come within the scope of the disclosure. It is contemplated that other embodiments may accommodate a reversible motor as shown in FIG. 4A. Tool 2 could comprise components as shown in FIG. 4B to allow a user to switch from a right-handed use to a left-handed use, and vice versa. In this alternate embodiment, both ends of portion 11A could comprise grooves 12, 13 or none at all.

Referring again to FIG. 3, it has been stated that blade plate 40 is mounted on anvil 45 to form blade assembly 50. Blade assembly 50 is attached to lower portion 11B by known means. A comb attachment 30 can be mounted thereto to provide for a clipper guide. If desired, a user may interchange a variety of comb attachments that adjust the length of a cut. In addition, blade assemblies of varying length could be provided to facilitate ease of use. For example, a longer blade length could result in fewer strokes needed to adequately trim a target's hair or fur as desired. In one embodiment, a blade length of about 2 inches was found to be useful. The stainless steel blades of the disclosed device can be photo-etched and serrated to provide a sharp cutting edge.

Figure 5:
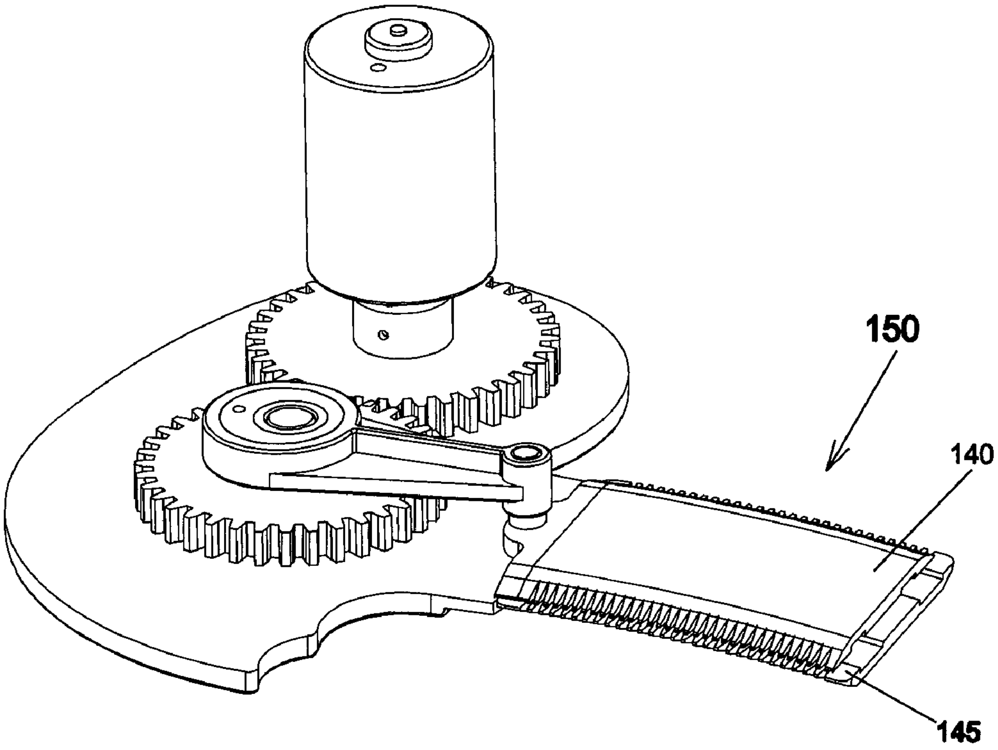
FIG. 5 depicts a blade assembly of the disclosed device with camber.

In addition, the blade assembly can be designed to provide an adequate camber to follow a target's contours. See for example FIG. 5 which depicts a cutaway view of an alternate embodiment of the disclosed device. Blade plate 140 is mounted on anvil 145 to form a blade assembly 150 having a positive camber or curvature. Although not shown, it is contemplated that in some embodiments a negative camber could be useful.

As shown in FIG. 3, tool 1 can comprise a finger sleeve 90. To install this embodiment of sleeve 90, each of tabs 91 can be inserted through a respective receiving slot 102. An end of tab 91 folds upwardly to envelop a respective portion of rail 100 and may be secured in place by known means. For example, hook and loop closure 92 or snap button fasteners can be utilized. In other embodiments, sleeve 90 can be snap-mounted into place on housing 11. Alternately, a tongue and groove attachment could be used to enable sleeve 90 to slide into place on housing 11.

FIG. 6 depicts tool 1 having finger sleeve 90 mounted thereon. A user can grasp tool 1 by positioning his/her thumb around motor housing 25 and placing his/her little and ring fingers in grooves 12, 13 (see also FIG. 1). In operation, a user may rest his/her index and middle fingers in grooves 14, 15 within space 98 provided by finger sleeve 90. Sleeve 90 facilitates an ergonomic grasping of tool 1 and allows a user's hand to remain relaxed during use. Sleeve 90 can also help to avoid slippage of the device and can assist the user in maintaining proper tool geometry with relation to a target. Sleeve 90 augments a securing of tool 1 in a user's palm.

Earlier embodiments of the disclosed device comprise straps having hook and loop closure means to secure the apparatus to the user's hand. In the embodiments shown herein, the apparatus can be cradled in a user's palm. Although not shown, hook and loop closure means could be an optional add-on. In all cases, trimming is accomplished by using a petting action or natural stroke to guide the tool over the desired cutting area of a target.

An advantage of using a petting action or natural stroke over the target is the provision of a trimming tool that is easy-to-use. A user need not be specifically trained in how to use the disclosed device; a user can simply pet or stroke the target area. Domestic pets, for example, dogs and cats can be groomed with ease at home with good results, which can reduce the need to incur the expense of a professional groomer. Groomers who use this tool can themselves decrease training time and/or reduce the number of technicians needed to help restrain an animal during grooming. Not only can the device provide an opportunity to lower the stress level of the target, the ergonomics of the tool may help to reduce arm, wrist, and neck discomfort and/or injury in the user.

Thus, the disclosed device provides a hand-held grooming device comprising a motor and a blade assembly. The blade assembly comprises at least two matching blade edges that resemble comb teeth. The blade assembly is attached to a linkage mechanism driven by the motor. When the motor is activated, the blade assembly is motivated to cut hair or fur of a target.

One having ordinary skill in the art would recognize that the materials of construction should meet design and engineering requirements. Conventional plastics used in housings for other electronic devices and even metal housings can be used. Ceramics blades and blades of materials other than stainless steel could be incorporated. In addition, the dimensions of the housing, the motor, and the internal components are sizeable as needed.

Although the disclosed device and method have been described with reference to disclosed embodiments, numerous modifications and variations can be made and still the result will come within the scope of the disclosure. No limitation with respect to the specific embodiments disclosed herein is intended or should be inferred.

I claim:

1. A palm-held trimmer comprising:

a housing having a first portion and a second portion, said second portion extending perpendicularly from a midpoint of said first portion;

said first portion having a semi-elliptical shape to enable an ergonomic grip;

said first portion further comprising finger grooves to rest a distal portion of a small finger and a distal portion of a ring finger;

said second portion having a top surface and a bottom surface, said top surface further comprising finger grooves to rest a distal portion of a middle finger and a distal portion of an index finger, said second portion finger grooves having a crest therebetween;

a cutting assembly mountable to an underside of said second portion and having blades exposed therefrom on two opposing edges;

a motor mountable to said first portion and situated to enable a hooked rest for a section of a user's palm located between a thumb and an index finger, whereby a gripping of said housing and said motor enables the housing to form an arcuate handle in the palm of the user's hand, and whereby a cutting stroke can occur with the movement of the second portion as guided by the user's middle or index finger.

2. The apparatus of claim 1 further comprising a comb attachment to adjust a cutting length of said exposed blades.

3. The apparatus of claim 1, wherein said second portion further comprises a finger sleeve.

4. The apparatus of claim 1, wherein said cutting assembly further comprises a blade camber to enable a user to follow a contour.

5. A grooming tool comprising:

a housing having a grip portion and an attachment portion, said attachment portion extending longitudinally from a lateral axis of said grip portion, said attachment portion having a top surface and a bottom surface, the top surface further comprising finger grooves to rest a distal portion of a user's fingers thereon;

a blade assembly mountable to said attachment portion, said blade assembly comprising one or more plates having blades on two opposing edges;

said blade assembly having a camber to enable a user to follow a target's curvatures; and an electric motor mountable to said grip portion and situated to enable a hooked rest for a section of the user's palm located between a thumb and an index finger, whereby a gripping of said housing and said motor enables the user to closely hold said tool in the palm of the user's hand and to urge said blade assembly in a cutting direction while petting or stroking said target.

6. The apparatus of claim 5, wherein said blade assembly enables a user to use either edge to cut said target's hair or fur by moving the apparatus through said target's hair or fur in a desired direction.

7. The apparatus of claim 5, wherein said attachment portion further comprises a sleeve to help secure said housing to a user's hand.

8. A method of providing a palm-held grooming tool; the method comprising the steps of:

mounting a cutting assembly to a bottom surface of an attachment portion of a housing, said cutting assembly comprising one or more plates having blades on two opposing edges, said attachment portion extending longitudinally from a lateral axis of a grip of the housing and having a top surface comprising finger grooves to rest a distal portion of at least one of a user's fingers thereon, said grip portion comprising a motor postionable to serve as a hooked rest for a section of a user's palm located between a thumb and an index finger, whereby a gripping of the housing and the motor enables the user to closely hold the tool in the palm of the user's hand; and urging said cutting assembly through a target's hair or fur in a desired direction to enable a cutting of said target's hair or fur.

9. The method of claim 8 further comprising the step of mounting a comb attachment to said cutting assembly to adjust cutting length.

10. The method of claim 8 further comprising the step of energizing said motor mountable on said grip portion.

11. The method of claim 10 further comprising the step of repositioning said motor on said grip portion to provide for a right-handed or left-handed grip.

* * * * *